United States Patent
Berube et al.

(10) Patent No.: US 9,388,860 B2
(45) Date of Patent: Jul. 12, 2016

(54) RETAINING RING FOR A CONSTANT VELOCITY JOINT AND METHOD OF ASSEMBLY USING THE SAME

(75) Inventors: Matthew A. Berube, Saginaw, MI (US); Keith A. Kozlowski, Lynn Haven, FL (US); Jorge Flores-Garay, Freeland, MI (US)

(73) Assignees: STEERING SOLUTIONS IP HOLDING CORPORATION, Saginaw, MI (US); GM GLOBAL TECHNOLOGY OPERATIONS, INC., Detroit, MI (US)

( * ) Notice: Subject to any disclaimer, the term of this patent is extended or adjusted under 35 U.S.C. 154(b) by 171 days.

(21) Appl. No.: 12/726,454

(22) Filed: Mar. 18, 2010

(65) Prior Publication Data
US 2010/0254754 A1 Oct. 7, 2010

Related U.S. Application Data

(60) Provisional application No. 61/161,357, filed on Mar. 18, 2009.

(51) Int. Cl.
*F16B 21/16* (2006.01)
*F16D 3/223* (2011.01)
(Continued)

(52) U.S. Cl.
CPC .............. *F16D 3/223* (2013.01); *F16D 1/116* (2013.01); *F16D 2001/103* (2013.01); *F16D 2003/22313* (2013.01); *F16D 2300/12* (2013.01); *Y10S 464/906* (2013.01); *Y10T 403/583* (2015.01)

(58) Field of Classification Search
CPC ........ F16B 21/125; F16B 21/16; F16B 21/18; F16B 21/183; F16B 21/186; F16D 2003/22313; F16D 3/223; F16D 2300/12; F16D 1/116; F16L 37/091
USPC ........... 403/315, 316, 319, 57, 128, 131, 289, 403/317, 320, 359.5, 360, 371, 372, 376, 403/DIG. 7; 411/517, 519, 353; 464/182, 464/906, 143, 145; 285/232, 340
See application file for complete search history.

(56) References Cited

U.S. PATENT DOCUMENTS 2,225,208 A * 12/1940 Crickmer ...................... 285/104
2,739,615 A * 3/1956 Wurzel ........................... 411/519
(Continued)

FOREIGN PATENT DOCUMENTS

CN 1619172 A 5/2005
CN 101078454 A 11/2007
(Continued)

OTHER PUBLICATIONS

Office Action, Issued Jul. 17, 2015, (Chinese Office Action).

*Primary Examiner* — Daniel P Stodola
*Assistant Examiner* — Matthew R McMahon
(74) *Attorney, Agent, or Firm* — Cantor Colburn LLP

(57) ABSTRACT

A retaining ring for a constant velocity joint includes an annular, C-shaped retainer body that tapers inwardly toward the longitudinal axis from a first end opening and a first end to a second end opening and a second end, the retainer body comprising a first retainer leg and an opposed second retainer leg, the first retainer leg and the second retainer leg joined together on a proximal end and separated on respective distal ends by a gap. It also includes an axially extending annular rib disposed on the first end of the retainer body. It further includes a relief feature formed on the second end of the first retainer leg and a relief feature formed on the second end of the second leg, the relief feature on the first retainer leg and the relief feature on the second retainer leg disposed closer to the proximal end than the distal ends.

20 Claims, 5 Drawing Sheets

(51) Int. Cl.
*F16D 1/116* (2006.01)
*F16D 1/10* (2006.01)

(56) References Cited

U.S. PATENT DOCUMENTS

| | | | | |
|---|---|---|---|---|
| 2,755,698 A * | 7/1956 | Wurzel | | 411/517 |
| 3,662,642 A * | 5/1972 | Bernard | | 411/518 |
| 3,995,897 A * | 12/1976 | Paskert | | 285/340 |
| 4,073,514 A * | 2/1978 | Pate | | 285/149.1 |
| 4,146,254 A * | 3/1979 | Turner et al. | | 285/105 |
| 4,322,175 A * | 3/1982 | Szczesny | | 403/134 |
| 4,364,615 A * | 12/1982 | Euler | | 384/517 |
| 4,471,978 A | 9/1984 | Kramer | | |
| 4,508,369 A * | 4/1985 | Mode | | 285/39 |
| 4,593,944 A * | 6/1986 | Milberger | | 285/321 |
| 4,623,277 A * | 11/1986 | Wayne et al. | | 403/314 |
| 4,643,466 A * | 2/1987 | Conner et al. | | 285/321 |
| 4,756,640 A * | 7/1988 | Gehrke | | 403/326 |
| 4,813,808 A * | 3/1989 | Gehrke | | 403/326 |
| 4,819,974 A * | 4/1989 | Zeidler | | 285/373 |
| 4,854,764 A * | 8/1989 | Faber et al. | | 403/13 |
| 5,039,141 A * | 8/1991 | Badoureaux | | 285/340 |
| 5,160,179 A * | 11/1992 | Takagi | | 285/340 |
| 5,647,685 A * | 7/1997 | Fukui et al. | | 403/370 |
| 5,722,702 A * | 3/1998 | Washburn | | 285/340 |
| 5,988,705 A * | 11/1999 | Norkey | | 285/319 |
| 6,062,611 A * | 5/2000 | Percebois et al. | | 411/517 |
| 6,179,347 B1 * | 1/2001 | Dole et al. | | 285/321 |
| 6,203,441 B1 * | 3/2001 | Iarrera | | 464/182 |
| 6,296,417 B1 * | 10/2001 | Kinnersly | | 403/366 |
| 6,361,261 B1 * | 3/2002 | Gattone et al. | | 411/526 |
| 6,390,925 B1 * | 5/2002 | Perrow | | 403/316 |
| 6,913,292 B2 * | 7/2005 | Snyder et al. | | 285/340 |
| 6,988,747 B2 * | 1/2006 | Allen et al. | | 285/322 |
| 7,040,670 B2 * | 5/2006 | Madden | | 285/376 |
| 7,285,880 B2 * | 10/2007 | Hyun | | 310/23 |
| 7,316,429 B2 * | 1/2008 | Viegener | | 285/340 |
| 7,507,049 B2 * | 3/2009 | Eidam | | 403/315 |
| 7,686,349 B2 * | 3/2010 | Guest | | 285/321 |
| 7,771,123 B2 | 8/2010 | Loustanau et al. | | |
| 7,793,473 B2 * | 9/2010 | Sorkin | | 52/223.13 |
| 7,841,630 B1 * | 11/2010 | Auray et al. | | 285/340 |
| 7,862,281 B2 * | 1/2011 | Doubler et al. | | 411/433 |
| 7,887,013 B2 * | 2/2011 | Chen et al. | | 248/56 |
| 7,914,051 B2 * | 3/2011 | Stoll et al. | | 285/322 |
| 2004/0253050 A1 * | 12/2004 | Eidam | | 403/315 |
| 2006/0257230 A1 * | 11/2006 | Tanaka et al. | | 411/221 |
| 2008/0038053 A1 * | 2/2008 | Lai | | 403/371 |
| 2009/0194990 A1 * | 8/2009 | Williams | | 285/23 |

FOREIGN PATENT DOCUMENTS

| | | |
|---|---|---|
| DE | 102007025325 A1 * | 2/2009 |
| FR | 2899660 * | 4/2007 |
| WO | 2008128259 A1 | 10/2008 |

* cited by examiner

RETAINING RING FOR A CONSTANT VELOCITY JOINT AND METHOD OF ASSEMBLY USING THE SAME

CROSS-REFERENCES TO RELATED APPLICATIONS

This patent application claims priority to U.S. Provisional Patent Application Ser. No. 61/161,357 filed Mar. 18, 2009, which is incorporated herein by reference in its entirety.

FIELD OF THE INVENTION

The subject invention relates to a constant velocity joint, and more specifically to a fixed center constant velocity joint and a retaining ring for assembly of the fixed center constant velocity joint.

BACKGROUND

Fixed center constant velocity joints typically comprise an outer member, which defines a spherical interior and a plurality of outer member ball tracks within the interior, the interior and the plurality of outer member ball tracks extend along a longitudinal axis. An inner member is disposed within the interior, and defines a spherical outer surface and a plurality of inner member ball tracks extending along the longitudinal axis. Each of the outer member ball tracks opposes one of the inner member ball tracks to define a funnel. The constant velocity joint further comprises a plurality of drive balls, with one of the drive balls disposed within each of the funnels. A cage is disposed between the outer member and the inner member. The cage defines a plurality of windows. One of the drive balls is disposed within each of the windows.

The outer member is preferably integrally formed with a first shaft, hereinafter referred to as a driving shaft. The inner member is preferably coupled to a second shaft, hereinafter referred to as a driven shaft. The inner member may be coupled to the driven shaft in any suitable manner, but is preferably coupled via a splined connection, in which the inner member defines a splined bore and the driven shaft includes a splined end disposed within the splined bore in interlocking engagement. Typically, a retaining ring interlocks the driven shaft and the inner member to prevent disengagement of the driven shaft from the inner member during operation.

Various designs and configurations of the retaining ring have previously been utilized. However, each of these designs had associated shortcomings, such as providing difficult or unpredictable assembly, or requiring increased assembly effort. Others required modifications to the axle shafts or could not be disassembled after assembly, or both.

Thus, there remains a need for a retaining ring for a fixed center constant velocity joint that may be used for coupling the inner member of the fixed center joint to a shaft and that addresses shortcomings associated with related art retaining ring designs.

SUMMARY OF THE INVENTION

In one exemplary embodiment of the present invention, a retaining ring for a constant velocity joint is provided. The retaining ring includes an annular, C-shaped retainer body having a longitudinal axis, the retainer body tapering inwardly toward the longitudinal axis from a first end opening and a first end to a second end opening and a second end, the retainer body comprising a first retainer leg and an opposed second retainer leg, the first retainer leg and the second retainer leg joined together on a proximal end and separated on respective distal ends by a gap. The retaining ring also includes an axially extending annular rib disposed on the first end of the retainer body. The retaining ring further includes a relief feature formed on the second end of the first retainer leg and a relief feature formed on the second end of the second leg, the relief feature on the first retainer leg and the relief feature on the second retainer leg disposed closer to the proximal end than the distal ends.

In another exemplary embodiment of the present invention, a method of assembling a constant velocity joint is provided. The method includes forming a constant velocity joint assembly comprising an outer member, an inner member, a cage having a plurality of windows disposed between the outer member and the inner member and a plurality of spherical balls disposed between the outer member and the inner member within the windows of the cage, the inner member having an aperture configured for coupling a shaft, the aperture having a free end configured to receive the shaft and an annular aperture recess having a tapered sidewall and an annular bottom. The method also includes inserting a retaining ring into the aperture from the free end, the retaining ring comprising an annular, C-shaped retainer body having a longitudinal axis, the retainer body tapering inwardly toward the longitudinal axis from a first end opening and a first end to a second end opening and a second end, the retainer body comprising a first retainer leg and an opposed second retainer leg, the first retainer leg and the second retainer leg joined together on a proximal end and separated on respective distal ends by a gap; an axially extending annular rib disposed on the first end of the retainer body; and a relief feature formed on the second end of the first retainer leg and a relief feature formed on the second end of the second leg, the relief feature on the first retainer leg and the relief feature on the second retainer leg disposed closer to the proximal end than the distal ends. The method further includes seating the retaining ring in the annular aperture recess with an outer surface of the retainer body proximate the tapered sidewall and the axially extending annular rib proximate the annular bottom.

In yet another exemplary embodiment of the present invention, a method of assembling a constant velocity joint is provided. The method includes forming an inner member having an aperture configured for coupling a shaft, the aperture having a free end configured to receive the shaft, an opposed non-free end and an annular retainer recess having a tapered sidewall and an annular bottom. The method also includes inserting a retaining ring into the aperture from the free end or the non-free end, the retaining ring comprising an annular, C-shaped retainer body having a longitudinal axis, the retainer body tapering inwardly toward the longitudinal axis from a first end opening and a first end to a second end opening and a second end, the retainer body comprising a first retainer leg and an opposed second retainer leg, the first retainer leg and the second retainer leg joined together on a proximal end and separated on respective distal ends by a gap; an axially extending annular rib disposed on the first end of the retainer body; and a relief feature formed on the second end of the first retainer leg and a relief feature formed on the second end of the second leg, the relief feature on the first retainer leg and the relief feature on the second retainer leg disposed closer to the proximal end than the distal ends. The method further includes seating the retaining ring in the annular retainer recess with an outer surface of the retainer body proximate the tapered sidewall and the axially extending annular rib proximate the annular bottom. The method further includes forming a constant velocity joint assembly comprising an outer member, the inner member, a cage having a plurality of windows disposed between the outer member and the inner member and a plurality of spherical balls disposed between the outer member and the inner member within the windows of the cage.

The above features and advantages and other features and advantages of the present invention are readily apparent from the following detailed description of the invention when taken in connection with the accompanying drawings.

BRIEF DESCRIPTION OF THE DRAWINGS

Advantages of the present invention will be readily appreciated as the same becomes better understood by reference to the following detailed description when considered in connection with the accompanying drawings.

DESCRIPTION OF THE EMBODIMENTS

Figure 1:
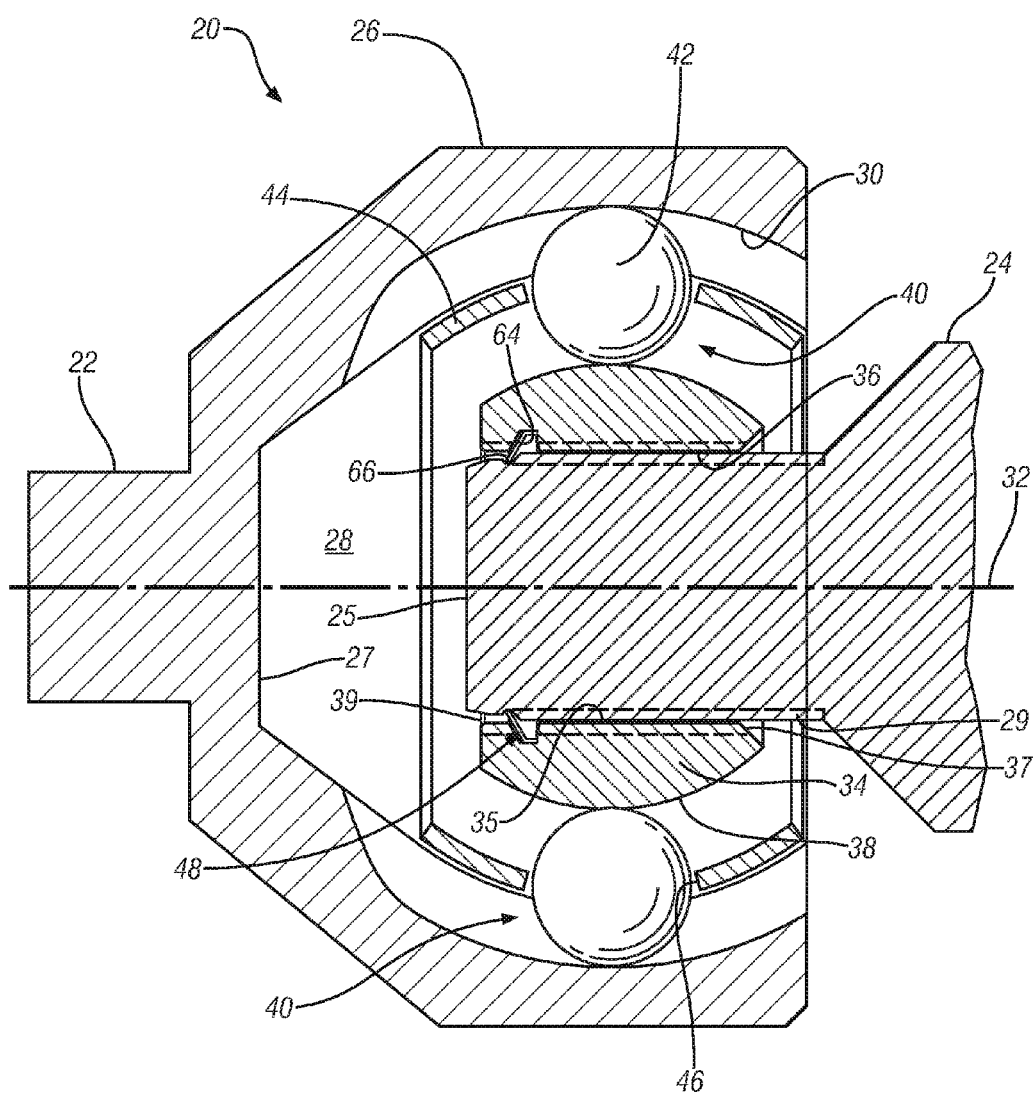
FIG. 1 is a cross-sectional view of an exemplary embodiment of a retaining ring and a constant velocity joint incorporating the same taken along a longitudinal axis of the joint.

The following description is merely exemplary in nature and is not intended to limit the present disclosure, application or uses. It should be understood that throughout the drawings, corresponding reference numerals indicate like or corresponding parts and features.

Referring to the FIGS., a constant velocity joint is shown generally at 20. The constant velocity joint 20 rotatably couples a driving shaft 22 to a driven shaft 24. The constant velocity joint 20 permits relative rotation between the driving shaft 22 and the driven shaft 24 when the driving shaft 22 and the driven shaft 24 are angled (i.e., articulated) relative to one another as is well known in the art.

Referring to FIG. 1, the constant velocity joint 20 includes an outer member 26. The outer member 26 includes an attachment end for coupling the outer member 26 to the driving shaft 22. Typically, the driving shaft 22 is integrally formed with the outer member 26. However, it should be appreciated that the driving shaft 22 may be fixedly connected to the attachment end of the outer member 26 by any suitable method.

The outer member 26 defines an interior 28 and a plurality of outer member ball tracks 30 within the interior 28. The interior 28 and the plurality of outer member ball tracks 30 extend along a longitudinal axis 32. Preferably, the plurality of outer member ball tracks 30 include a longitudinally arcuate profile extending along the longitudinal axis 32, and a semi-circular cross-section extending transverse to the longitudinal axis 32. However, it should be appreciated that the outer member ball tracks 30 may include a shape other than the arcuate profile shown and described herein.

An inner member 34 is disposed within the interior 28 of the outer member 26. The inner member 34 defines an aperture 36 for receiving the driven shaft 24 therein, which extends away from the attachment end or free end 37 toward an opposed non-free end 39, or the end that faces into the closed end 27 of outer member 26. The driven shaft 24 is coupled to the inner member 34 for rotation with the inner member 34. For example, the aperture 36 and the driven shaft 24 may each include complementary splines for engaging one another via a splined connection therebetween. It should be appreciated, however, that the driven shaft 24 may be coupled to the inner member 34 in other suitable manners not described herein.

The inner member 34 defines a plurality of inner member ball tracks 38, which extend along the longitudinal axis 32. Preferably, the inner member ball tracks 38 include an arcuate profile extending along the longitudinal axis 32, and a semi-circular cross-section extending transverse to the longitudinal axis 32. However, it should be appreciated that the inner member ball tracks 38 may include a shape other than the arcuate profile shown and described herein.

Each of the outer member ball tracks 30 is disposed opposite and faces one of the inner member ball tracks 38. Each pair of opposing outer member ball tracks 30 and inner member ball tracks 38 cooperate together to define a funnel 40. Accordingly, a plurality of funnels 40 exist, which are disposed radially about the longitudinal axis 32.

The constant velocity joint 20 further comprises a plurality of drive balls 42. Each of the plurality of drive balls 42 includes a spherical shape and transmits torque between the outer member 26 and the inner member 34. One of the plurality of drive balls 42 is disposed within each of the funnels 40.

A cage 44 is disposed between the outer member 26 and the inner member 34. The cage 44 defines a plurality of windows 46 with one of the plurality of drive balls 42 disposed within each of the plurality of windows 46. The cage 44 maintains the drive balls 42 in a plane as the constant velocity joint 20 articulates to permit relative angular movement between the driving shaft 22 and the driven shaft 24.

Figure 2:
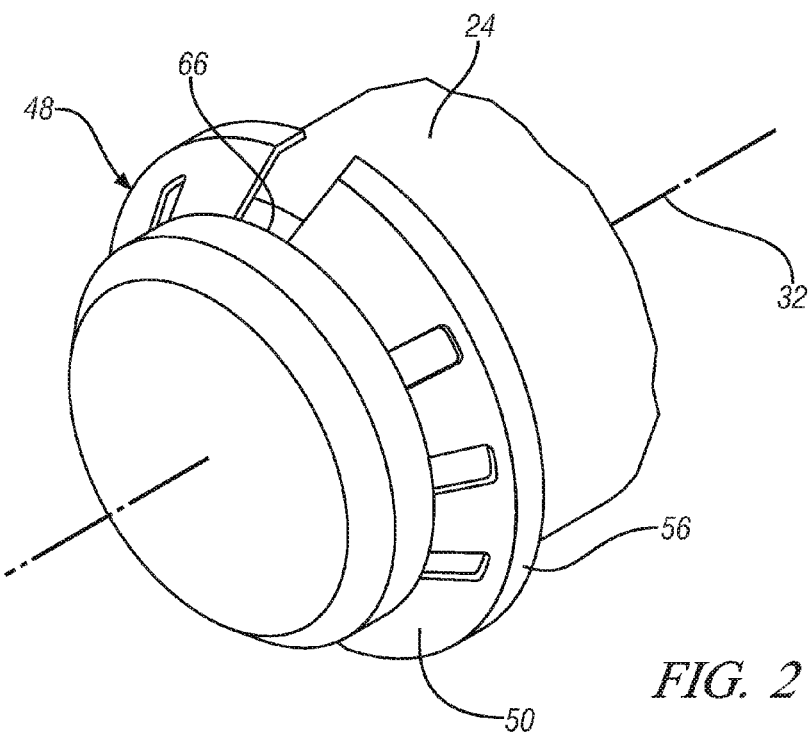
FIG. 2 is a perspective view of the driven shaft and exemplary embodiment of the retaining ring of FIG. 1.
Figures 3, 4:
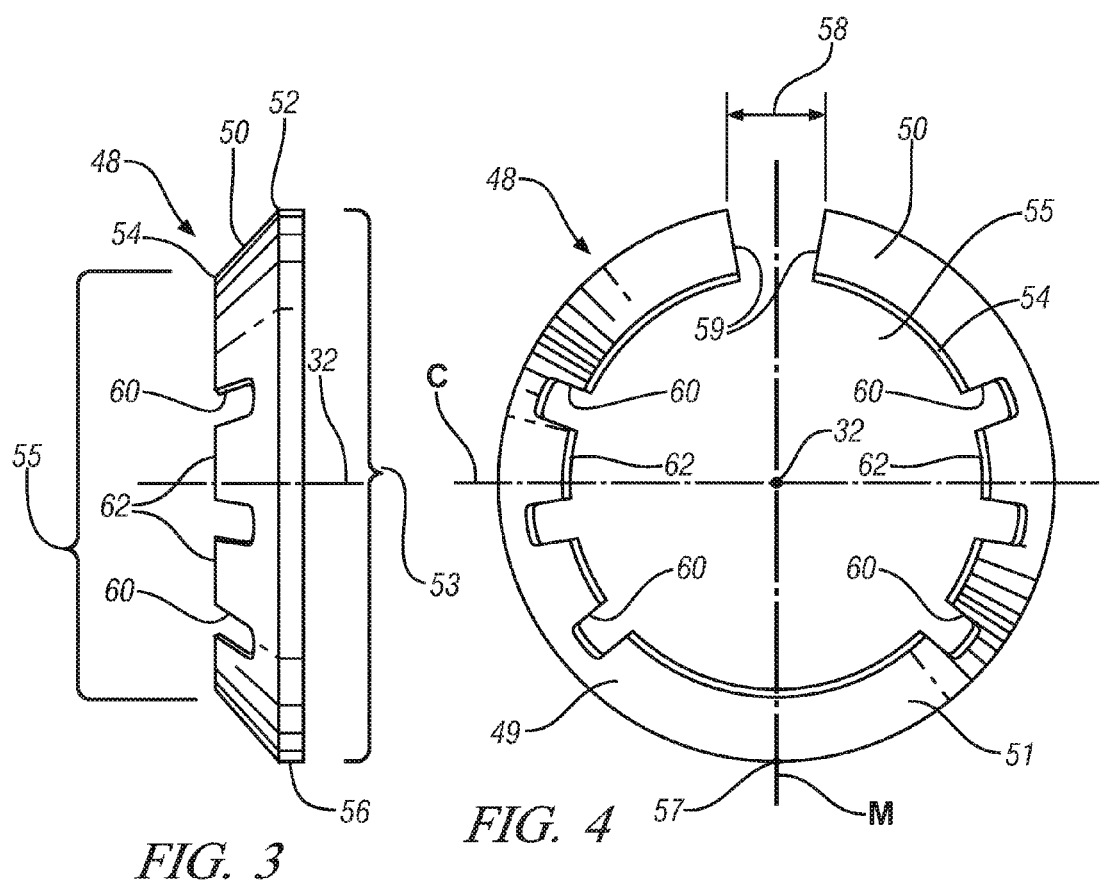
FIG. 3 is a side plan view of the retaining ring of FIG. 2.
FIG. 4 is a front plan view of the retaining ring of FIG. 2.

A retaining ring 48 couples or interconnects the inner member 34 and the driven shaft 24 as illustrated in FIG. 1. Referring to FIG. 2, an exemplary embodiment of the retaining ring 48 and driven shaft 24 is illustrated with the retaining ring 48 shown disposed on the driven shaft 24. Referring to FIGS. 3 and 4, the exemplary embodiment of the retaining ring 48 is shown. The retaining ring 48 includes a body 50 having truncated conical shape, in which the body 50 includes a first end 52 defining a first end opening 53 having a first diameter, and extends along the longitudinal axis 32 tapering inwardly toward the axis to a second end 54 that defines a second end opening 55 having a second diameter that is smaller than the first diameter. An annular rib 56 extends around an outer periphery of the first end 52. The annular rib 56 extends from the body 50 of the retaining ring 48 in a direction that is parallel to the driven shaft 24 (i.e. parallel to the longitudinal axis 32). The retaining ring may comprise a metal part, and more particularly an integral stamped metal part. The metal part my comprise steel.

Figure 5:
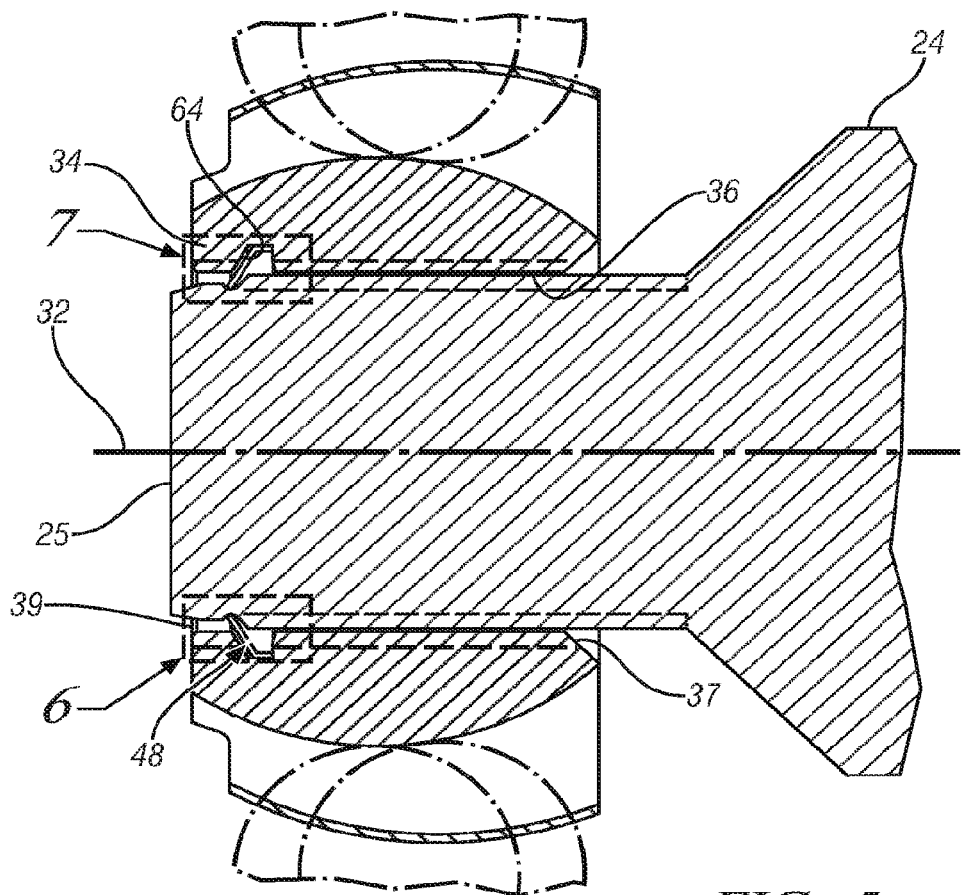
FIG. 5 is an enlarged cross-sectional view of the inner member of the constant velocity joint of FIG. 1.
Figure 6:
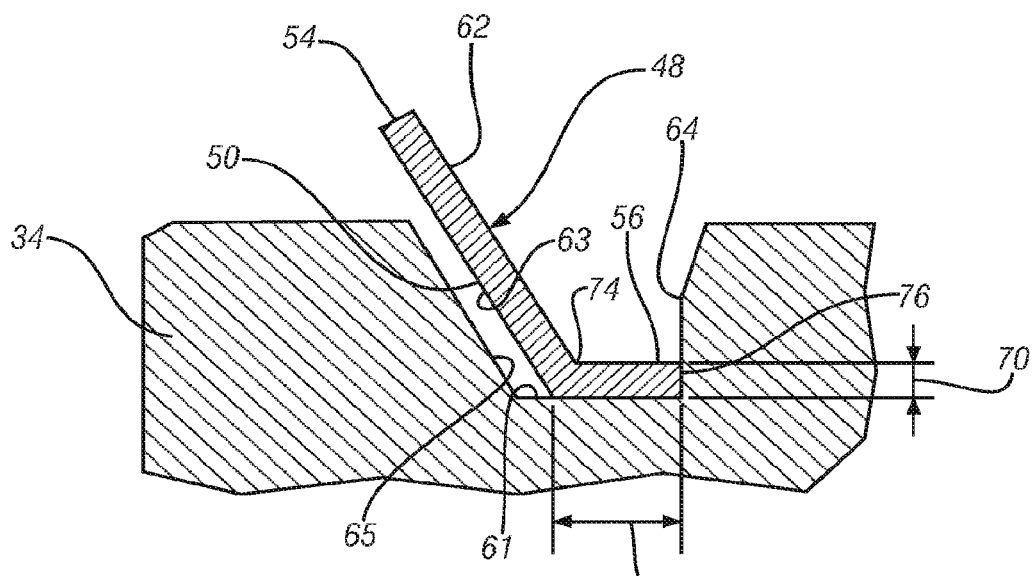
FIG. 6 is a further enlarged cross-sectional view of Region 6 of FIG. 5 illustrating the retaining ring in engagement with the inner member.

Referring to FIGS. 1-6, the annular ring includes an interrupted annular shape or C-shape, in which a portion of the annular shape is removed to define a gap 58, which permits radial flexure of the retaining ring 48. The retaining ring 48 further includes a plurality of relief features or recesses 60 disposed about the second end 54 of the body 50. The relief features 60 cooperate to define a plurality of fingers 62 therebetween. As shown, the relief features 60 include generally rectangular-grooves. However, it should be appreciated that the relief features 60 may include some other shape not shown or described herein. As shown, retaining ring 48 includes a total of six relief features 60. The relief features 60 are spaced equally or the same along opposing semicircular legs 49, 51 comprising a left side and a right side of the retaining ring 48 as defined by a midplane M that bisects the opposing legs and includes the longitudinal axis 32 of annular retaining ring 48, such that relief features 60 on leg 49 are mirror images of relief features 60 on leg 51 about midplane M. The relief features 60 include two relief features 60 disposed below a central plane C that is orthogonal to midplane M and also intersects longitudinal axis 32 and a single relief feature 60 disposed slightly above central plane C on each of the opposing semicircular legs 49, 51 comprising a left side and the right side of the retaining ring 48. The midplane M also bisects the gap 58 of the annular retaining ring 48, with the central plane being disposed perpendicular to the midplane M and including longitudinal axis 32, as described herein. The gap 58 of the retaining ring 48 is disposed on the same side of the central plane C as the single relief feature 60. As such, the number and spacing of relief features 60, as well as the proportion of fingers 62, is imbalanced about central plane C. The relief features 60 and fingers 62 are also spaced asymmetrically about central plane C. Referring particularly to FIG. 6, annular rib 56 has a thickness 70 transverse to the longitudinal axis 32, a length 72 parallel to the longitudinal axis 32 that is greater than the thickness, a proximal end 74 and a distal end 76, the proximal end of the annular rib disposed on the first end 52 of the retainer body 50.

Figure 9:
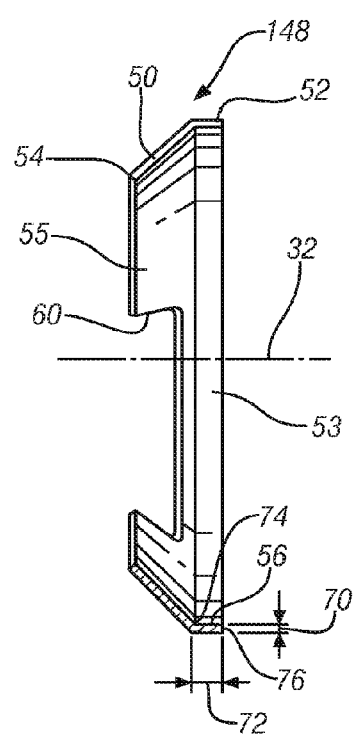
FIG. 9 is a cross-sectional view of the retaining ring of FIG. 8 taken along section 9-9.
Figure 8:
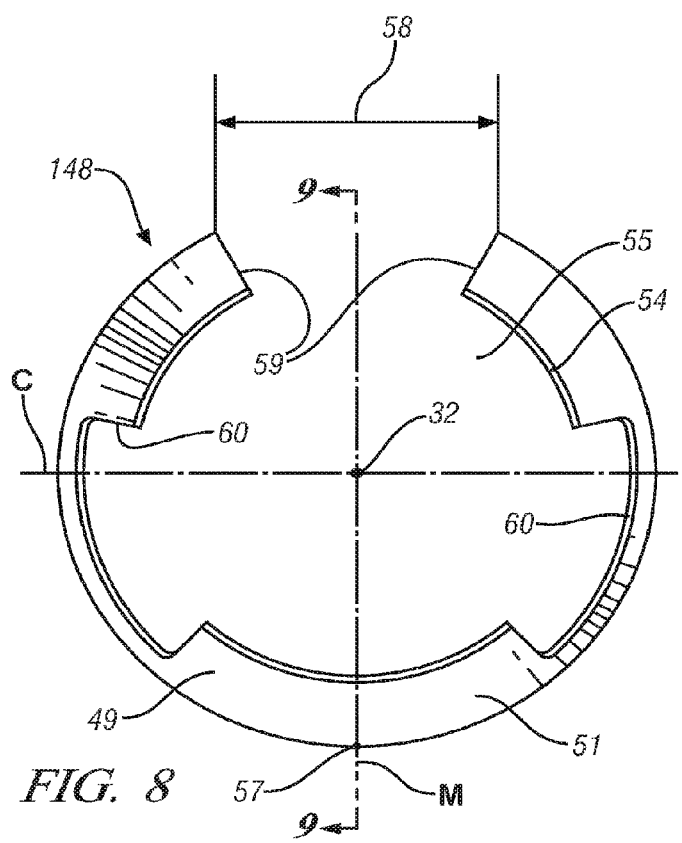
FIG. 8 is a front plan view of a second exemplary embodiment of a retaining ring for a constant velocity joint as disclosed herein.

Referring to FIGS. 8 and 9, another embodiment of a retaining ring 148 is shown. This embodiment of the retaining ring 148 is similar to the embodiment of the retaining ring 48 described above. Relief features 60 are again spaced equally or the same along opposing semicircular legs 49, 51 comprising a left side and a right side of the retaining ring 148 as defined by a midplane M that bisects the opposing legs and intersects the longitudinal axis 32 of annular retaining ring 148, such that relief features 60 on leg 49 are mirror images of relief features 60 on leg 51 about midplane M. Referring particularly to FIG. 9, annular rib 56 also has a thickness 70 transverse to the longitudinal axis 32, a length 72 parallel to the longitudinal axis 32 that is greater than the thickness, a proximal end 74 and a distal end 76, the proximal end of the annular rib disposed on the first end 52 of the retainer body 50. However, retaining ring 148 does not include a plurality of relief features 60 on each of opposing legs 49, 51, but rather includes only a single relief feature on each leg. Since it does not include a plurality of relief features on each of opposing legs 49, 51, retaining ring 148 also does not include fingers 62 disposed between the relief features 60. Accordingly, the relief features 60 of the retaining ring 148 are circumferentially larger or wider than the relief features 60 of retaining ring 48. Additionally, retaining ring 148 only includes two relief features 60, with each disposed symmetrically and equally on opposite sides of midplane M. However, the relief features 60 are not disposed equally or symmetrically about central plane C. In the embodiment of FIGS. 8 and 9, the relieved surface area of annular retaining ring 148, particularly the amount of body 50 removed from second end 54, is not symmetrically distributed about central plane C. In the embodiment illustrated in FIGS. 8 and 9, a greater proportion of second end 54 is removed from the central plane C to the proximal end 57 than from the central plane C to gap 58. The relief feature 60 is disposed asymmetrically about central plane C. The asymmetric disposition of relief features 60 and the annular rib 56 provide a predetermined torsional response characteristic, particularly a predetermined torsional rigidity, to annular retaining rings 48 and 148. In particular, the asymmetry provides greater flexure of the proximal end 57 (i.e., the apex of convex curvature of the retaining ring) of the retaining ring 48, 148 during insertion of the shaft into the ring and reduced flexure of the distal ends 59, particularly respective increases and decreases in the flexure of the fingers 62 proximate these ends. Thus, the retaining rings 48, 148 described herein provide desirable seating of the entire second end 54 in annular shaft recess 66, and avoid over-flexure of the fingers 62 proximate the distal ends 59 to an extent that they do not seat in the annular shaft recess 66 as has been observed to occur in certain related art retainer designs, and thereby improve the seating of the retaining ring 48, 148 in the annular shaft recess 66, particularly the portion, including the fingers 62, proximate the distal ends 59, and the attachment of the driven shaft 24 to the inner member 34.

It should be appreciated that the relief features 60 may vary in circumferential length and orientation from those shown in the illustrated embodiments of the retaining rings 48, 148. Also, it should be appreciated that the retaining rings, such as retaining rings 48, 148, may include any number of fingers 62 and relief features 60 as design parameters require. As such, it should be appreciated that the various embodiments of retaining rings, including retaining rings 48, 148, are designed with a predetermined torsional rigidity to flex appropriately to permit the entire second end 54 of the retaining ring, such as retaining rings 48, 148, to engage the annular shaft recess 66 at the same time, thereby reducing the opportunity for dislodgment of the retaining ring 48, 148 and driven shaft 24 during assembly. The flexural characteristics of the retaining rings 48, 148 are controlled by the orientation and size of the relief features 60, the presence and number of any fingers 62 defined therebetween, and the circumferential length of the gap 58. Accordingly, adjusting the relief features 60 and the fingers 62 adjusts the flexural characteristics of the retaining ring 48, 148. It should be appreciated that the retaining ring may be designed in some other manner than shown and described herein.

Referring to FIGS. 5 and 6, the inner member 34 includes an annular aperture recess 64. The retaining ring 48 is disposed within the annular aperture recess 64, with the annular rib 56 disposed proximate the annular bottom 61 of the annular aperture recess 64, the outer surface 63 of the tapered body 50 proximate the tapered sidewall 65 of the recess and the second end 54 of the retaining ring 48 extending up and out of the annular aperture recess 64 for engaging and securing the driven shaft 24. As illustrated in FIG. 6, annular aperture recess 64 includes a generally trapezoidal shape along the longitudinal axis 32. Annular aperture recess 64 may be disposed at any suitable location within the aperture 36 of the inner member 34. In an exemplary embodiment, it is located proximate the non-free end 39 of aperture 36.

Figure 7:
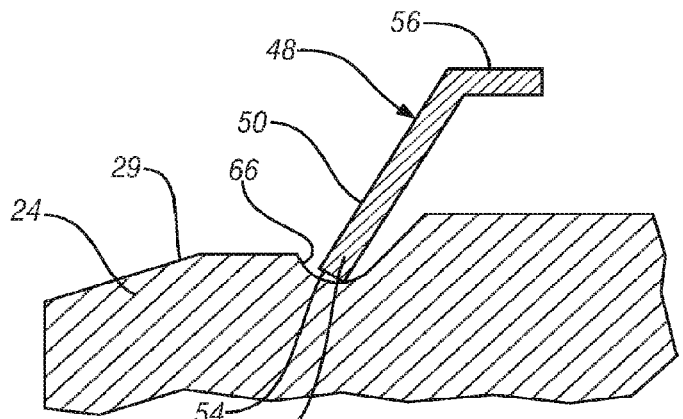
FIG. 7 is a further enlarged cross-sectional view of Region 7 of FIG. 5 illustrating the retaining ring in engagement with the driven shaft.

Referring to FIG. 7, the driven shaft 24 includes an annular shaft recess 66. Annular shaft recess 66 may be located at any suitable location along the portion of driven shaft 24 disposed within aperture 36, so long as it is configured to be located in an opposing relation adjacent to annular aperture recess 64 upon insertion of the driven shaft 24 in aperture 36. In an exemplary embodiment, annular shaft recess 66 is disposed near an insertion end 25 of the driven shaft 24. The second end 54 of the retaining ring 48, 148, and particularly the fingers 62 of the retaining ring 48, are disposed within the annular shaft recess 66 in a generally snap-fit interlocking connection therebetween. In an exemplary embodiment, a portion of the aperture 36 comprises a splined aperture surface 35, FIG. 1, and the driven shaft 24 comprises a splined outer surface 29 that is configured for interlocking coupled engagement with the splined aperture surface 35. The interlocking coupled engagement of the splined aperture surface 35 and splined shaft surface 29 is effected by inserting the shaft until it is secured in retained engagement by retaining ring 48, 148, as described herein.

To assemble the constant velocity joint 20, the retaining ring 48, 148 is placed within the annular aperture recess 64 of the inner member 34 by one of the methods described herein. According to one exemplary method 100, FIG. 10, the constant velocity joint 20 assembly, less the retaining ring 48, 148, is assembled, and then the retaining ring 48, 148 is inserted into the free end 37 of aperture 36. According to another exemplary method 200, FIG. 11, the retaining ring 48, 148 is inserted into the free end 37 or non-free end 39 of aperture 36 of inner member 34, and then the constant velocity joint 20 assembly, including inner member 34 and the retaining ring 48, 148, is assembled. According to either method, once the constant velocity joint 20 assembly, including retaining ring 48, 148 has been assembled, the driven shaft 24 may be inserted into the free end 37 of aperture 36 of the inner member 34 into engagement with the retaining ring 48, 148. The retaining ring 48, 148 spreads radially open while the body 50 of the retaining ring 48 flexes to allow insertion of the driven shaft 24 therethrough until the fingers 62 of the retaining ring 48 snap into the annular shaft recess 66 of the driven shaft 24, thereby interlocking the inner member 34 and the driven shaft 24 together. Once the driven shaft 24 has been assembled by joining it to constant velocity joint 20 according to either of the methods described above, it may be disassembled and removed from the constant velocity joint 20 by fixing the position of the constant velocity joint 20, such as by placing it in a fixture (not shown) that abuts the inner member 34 and has an opening (not shown) through which the driven shaft 24 extends, and applying a predetermined axial extraction force FE, FIG. 5, to the driven shaft 24. Disassembly may also be accomplished by reversing this procedure through suitable fixing of the driven shaft 24, such as in a clamp, and application of the extraction force FE to the constant velocity joint 20. In order to extract driven shaft 24 in the manner indicated, the second end 54 of retaining ring 48, 148 must be deformed, either elastically or plastically, by predetermined axial extraction force FE sufficiently for the end to flex, such as by buckling or bowing, and release driven shaft 24. The predetermined axial extraction force FE may be closely controlled by controlling the material properties of the retaining ring (e.g., modulus of elasticity, hardness, tensile, compressive and shear strength) or the design properties (e.g., size, shape and number of relief features 60 and fingers 62, and ring thickness 70, FIGS. 6-9) of retaining ring 48, 148. It will be understood that the predetermined axial extraction force FE may also define a maximum axial separation force that the constant velocity joint 20 and driven shaft 24 assembly may be exposed to during use without a risk of detachment. The ability to closely control the predetermined axial extraction force FE by material selection and the design of retaining ring 48, 148 is an advantage, particularly over retention devices where the axial extraction force of driven shaft 24 is primarily controlled by sliding friction between the retention device and one or both of driven shaft 24 and inner member 34. In one example, the material of the retaining ring, 48, 148 may comprise an integral stamped metal part to provide the controlled material properties described above, and more specifically the retaining ring 48, 148 may comprise steel.

Figure 10:
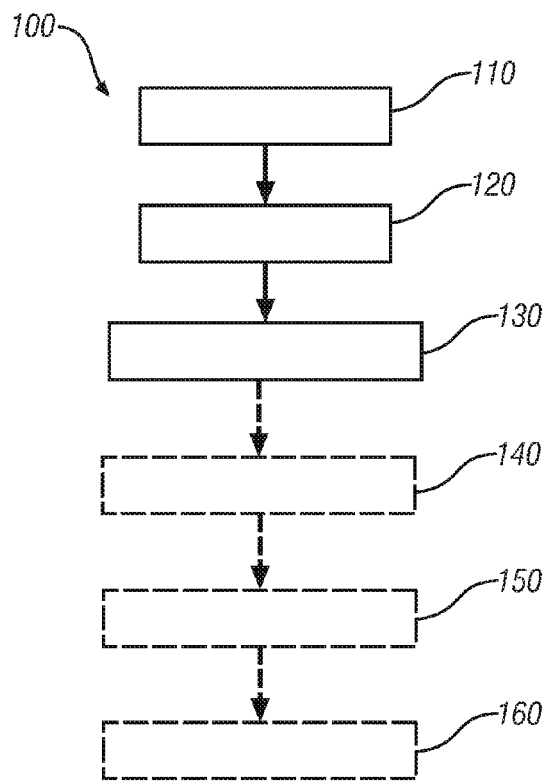
FIG. 10 is a flowchart of an exemplary embodiment of a method of assembly of a constant velocity joint and retaining ring as disclosed herein.

Referring to FIG. 10, in an exemplary embodiment, constant velocity joint 20 is assembled by a method 100 comprising the following steps. These steps include forming 110 a constant velocity joint assembly comprising an outer member 26, an inner member 34, a cage 44 having a plurality of windows 46 disposed between the outer member 26 and the inner member 34 and a plurality of spherical balls 42 disposed between the outer member 26 and the inner member 34 within the windows 46 of the cage 44. The inner member 34 has an aperture 36 configured for coupling with the driven shaft 24. The aperture 36 has a free end 37 configured to receive the driven shaft 24 and an annular aperture recess 64 having a tapered sidewall 65 and an annular bottom 61, as described herein. Method 100 also includes inserting 120 a retaining ring 48, 148 as described herein into the aperture 36 from the free end 37. Method 100 further includes seating 130 the retaining ring 48, 148 in the annular aperture recess 64 with the outer surface 63 of the retainer body 50 proximate the tapered sidewall 65 and the axially extending annular rib 56 proximate the annular bottom 61. When assembly of the driven shaft 24 to the constant velocity joint 20 is desired, method 100 may also include inserting 140 the insertion end 25 of the shaft having an annular shaft recess 66 that is configured to receive the second end 54 of the retaining ring into the free end 37 of the aperture 36 and securing 150 the shaft in retained engagement by inserting the insertion end 25 of the shaft through the first end opening 53 of the retaining ring 48, 148, expanding the second end 55 opening by interference with an outer surface 29 of the shaft and seating the second end 54 of the retaining ring 48, 148 within the annular shaft recess 66. Method 100 may also include detaching 160 the driven shaft 24 from the constant velocity joint 20 assembly by application of a predetermined axial extraction force to one of driven shaft 24 or constant velocity joint 20 relative to the other.

Figure 11:
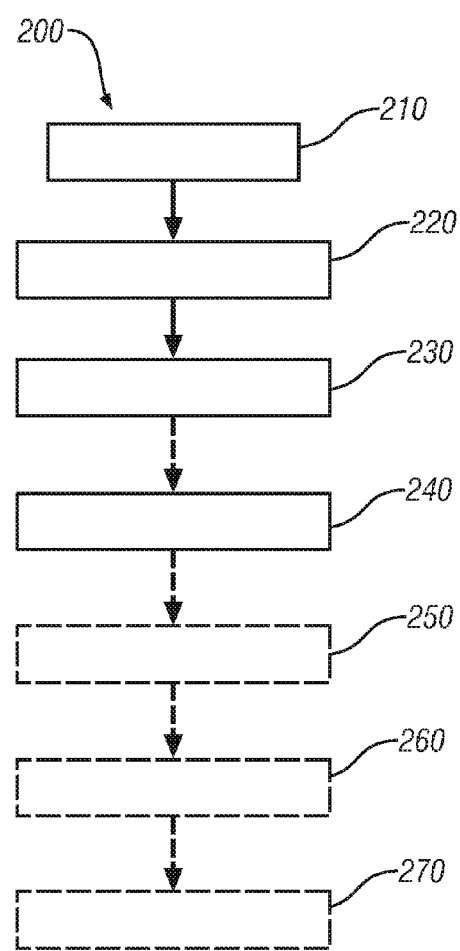
FIG. 11 is a flowchart of a second exemplary embodiment of a method of assembly of a constant velocity joint and retaining ring as disclosed herein.

Referring to FIG. 11, in another exemplary embodiment, constant velocity joint 20 is assembled by a method 200 comprising the following steps. These steps include forming 210 an inner member 34 having an aperture 36 configured for coupling with the driven shaft 24, the aperture 36 having a free end 37 configured to receive the shaft, an opposed non-free end 39 and an annular retainer recess 64 having a tapered sidewall 65 and an annular bottom 61. Method 200 also includes inserting 220 a retaining ring 48, 148 as described herein into the aperture 36 from the free end 37 or the non-free end, since either end is accessible. Method 200 also includes seating 230 the retaining ring in the annular retainer recess 64 with an outer surface 63 of the retainer body 50 proximate the tapered sidewall 65 and the axially extending annular rib 56 proximate the annular bottom 61. Method 200 also includes forming 240 a constant velocity joint 20 assembly comprising an outer member 26, the inner member 34, including the retaining ring 48, 148, a cage 44 having a plurality of windows 46 disposed between the outer member 26 and the inner member 34 and a plurality of spherical balls 42 disposed between the outer member 26 and the inner member 34 within the windows 46 of the cage 44. When assembly of the driven shaft 24 to the constant velocity joint 20 is desired, method 200 may also include inserting 250 the insertion end 25 of the shaft having an annular shaft recess 66 that is configured to receive the second end 54 of the retaining ring into the free end 37 of the aperture 36 and securing 260 the shaft in retained engagement by inserting the insertion end 25 of the shaft through the first end opening 53 of the retaining ring 48, 148, expanding the second end 55 opening by interference with an outer surface 29 of the shaft and seating the second end 54 of the retaining ring 48, 148 within the annular shaft recess 66. Method 200 may also include detaching 270 the driven shaft 24 from the constant velocity joint 20 assembly by application of a predetermined axial extraction force $F_E$ to one of driven shaft 24 or constant velocity joint 20 relative to the other.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A constant velocity joint assembly, comprising:
   a metal retaining ring, the retaining ring comprising:
      an annular, C-shaped, frustoconical retainer body having a longitudinal axis and a uniform thickness, the retainer body tapering inwardly toward the longitudinal axis from a first end opening at a first end to a second end opening at a second end, the retainer body comprising a first retainer leg and an opposed second retainer leg, the first retainer leg and the second retainer leg joined together on a proximal end and separated on respective distal ends by a gap;
      an axially extending annular rib having a uniform thickness transverse to the longitudinal axis, a length parallel to the longitudinal axis that is greater than the thickness, a proximal end and a distal end, the proximal end of the annular rib disposed on the first end of the retainer body, the annular rib extending axially parallel to the longitudinal axis along its length to the distal end, the retainer body extending away from the annular rib and tapering axially inwardly toward the longitudinal axis, wherein the thickness of the annular rib and the thickness of the retainer body are the same, and wherein the retainer body tapers inwardly toward the longitudinal axis only in one direction, away from the annular rib; and
      a relief feature formed on the second end of the first retainer leg and a relief feature formed on the second end of the second retainer leg, the relief feature on the first retainer leg and the relief feature on the second retainer leg disposed closer to the proximal end than the distal ends of the first and second retainer legs, respectively, the relief feature on the first retainer leg and the relief feature on the second retainer leg extending toward but not to the axially extending annular rib;
   a rotatable inner member of a constant velocity joint, the inner member comprising an aperture and an annular retainer recess disposed in the aperture; and
   a rotatable shaft, the shaft comprising an insertion end and an annular shaft recess, the shaft disposed in and rotatably coupled within the aperture to the inner member the retaining ring disposed between the shaft and aperture, the annular rib disposed in the annular retainer recess, the second end of the retainer body disposed in the annular shaft recess, the second end of the retainer body closer to the insertion end than the annular rib, the metal retaining ring retaining the shaft within the aperture.

2. The assembly of claim 1, wherein the retaining ring defines a midplane extending between the proximal end and the distal ends of the first and second retainer legs, respectively, and including the longitudinal axis, and a central plane that is orthogonal to the midplane and includes the longitudinal axis, and wherein the relief feature on the first retainer leg and the relief feature on the second retainer leg are disposed asymmetrically with reference to the central plane.

3. The assembly of claim 2, wherein the relief feature on the first retainer leg comprises a mirror image of the relief feature on the second retainer leg about the midplane.

4. The assembly of claim 1, wherein the relief feature on the first retainer leg and the relief feature on the second retainer leg each comprise a substantially rectangular recess.

5. The assembly of claim 1, wherein the relief feature on the first leg comprises a plurality of relief features formed on the first retainer leg and the relief feature on the second retainer leg comprises a plurality of relief features formed on the second retainer leg, and wherein the plurality of relief features on the first retainer leg define a first relieved surface area and the plurality of relief features on the second retainer leg define a second relieved surface area and a greater proportion of the first relieved surface area and a greater proportion of the second relieved surface area are disposed closer to the proximal end than the distal ends.

6. The assembly of claim 5, wherein the retaining ring defines a midplane extending between the proximal end and the distal ends of the first and second retainer legs, respectively, and including the longitudinal axis, and a central plane that is orthogonal to the midplane and includes the longitudinal axis, and wherein the plurality of relief features on the first retainer leg and the plurality of relief features on the second retainer leg are disposed asymmetrically with reference to the central plane.

7. The retaining ring of claim 6, wherein the plurality of relief features on the first retainer leg comprises a mirror image of the plurality of relief feature on the second retainer leg about the midplane.

8. The assembly of claim 6, wherein the plurality of relief features on the first retainer leg and the plurality of relief features on the second retainer leg comprise substantially rectangular recesses.

9. The assembly of claim 6, wherein the plurality of relief features on the first retainer leg comprises three relief features and the plurality of relief features on the second retainer leg comprises three relief features.

10. The assembly of claim 9, wherein two of the relief features on the first retainer leg are disposed between the central plane and the proximal end and one relief feature on the first retainer leg is disposed between the central plane and the distal ends and two of the relief features on the second retainer leg are disposed between the central plane and the proximal end and one relief feature on the second retainer leg is disposed between the central plane and the distal ends.

11. The assembly of claim 1, wherein the retaining ring comprises an integral stamped metal part.

12. The assembly of claim 1, wherein the shaft and inner member are selectively detachable from one another by elastic deformation of the retaining ring.

13. A constant velocity joint assembly, comprising:
   a metal retaining ring, comprising:
      an annular, C-shaped, frustoconical retainer body having a longitudinal axis and a uniform thickness, the retainer body tapering inwardly toward the longitudinal axis from a first end opening at a first end to a second end opening at a second end, the retainer body comprising a first retainer leg and an opposed second retainer leg, the first retainer leg and the second retainer leg joined together on a proximal end and separated on respective distal ends by a gap;

an annular rib having a uniform thickness transverse to the longitudinal axis and a length parallel to the longitudinal axis that is greater than the thickness, the annular rib extending axially parallel to the longitudinal axis to where the rib is disposed on the first end of the retainer body, the retainer body extending away from the annular rib and tapering axially inwardly toward the longitudinal axis, wherein the thickness of the annular rib and the thickness of the retainer body are the same, and wherein the retainer body tapers inwardly toward the longitudinal axis only in one direction, away from the annular rib; and a relief feature formed on the second end of the first retainer leg and a relief feature formed on the second end of the second retainer leg, the relief feature on the first retainer leg and the relief feature on the second retainer leg disposed closer to the proximal end than the distal ends, wherein the retainer body has an annular, C-shaped, frustoconical portion adjoining the annular rib, and wherein the relief feature of the first retainer leg and the relief feature of the second retainer leg do not extend into the annular, C-shaped, frustoconical portion;

a rotatable inner member of a constant velocity joint, the inner member comprising an aperture and an annular retainer recess disposed in the aperture; and a rotatable shaft, the shaft comprising an insertion end and an annular shaft recess, the shaft disposed in and rotatably coupled within the aperture to the inner member the retaining ring disposed between the shaft and aperture, the annular rib disposed in the annular retainer recess, the second end of the retainer body disposed in the annular shaft recess, the second end of the retainer body closer to the insertion end than the annular rib, the metal retaining ring retaining the shaft within the aperture.

14. The assembly of claim 13, wherein the retaining ring defines a midplane extending between the proximal end and the distal ends and including the longitudinal axis, and a central plane that is orthogonal to the midplane and includes the longitudinal axis, and wherein the relief feature on the first retainer leg and the relief feature on the second retainer leg are disposed asymmetrically with reference to the central plane.

15. The assembly of claim 14, wherein the relief feature on the first retainer leg comprises a mirror image of the relief feature on the second retainer leg about the midplane.

16. A constant velocity joint assembly, comprising:
a metal retaining ring, comprising:
an annular, C-shaped, frustoconical retainer body having a longitudinal axis and a uniform thickness, the retainer body tapering inwardly toward the longitudinal axis from a first end opening at a first end to a second end opening at a second end, the retainer body comprising a first retainer leg and an opposed second retainer leg, the first retainer leg and the second retainer leg joined together on a proximal end and separated on respective distal ends by a gap;

an annular rib having a uniform thickness transverse to the longitudinal axis and a length parallel to the longitudinal axis that is greater than the thickness, the annular rib extending axially parallel to the longitudinal axis to where the rib is disposed on the first end of the retainer body, the retainer body extending away from the annular rib and tapering axially inwardly toward the longitudinal axis, wherein the thickness of the annular rib and the thickness of the retainer body are the same, and wherein the retainer body tapers inwardly toward the longitudinal axis only in one direction, away from the annular rib; and a relief feature formed on the second end of the first retainer leg and a relief feature formed on the second end of the second retainer leg, the relief feature on the first retainer leg and the relief feature on the second retainer leg extending toward but not to the annular rib;

a rotatable inner member of a constant velocity joint, the inner member comprising an aperture and an annular retainer recess disposed in the aperture; and a rotatable shaft, the shaft comprising an insertion end and an annular shaft recess, the shaft disposed in and rotatably coupled within the aperture to the inner member the retaining ring disposed between the shaft and aperture, the annular rib disposed in the annular retainer recess, the second end of the retainer body disposed in the annular shaft recess, the second end of the retainer body closer to the insertion end than the annular rib, the metal retaining ring retaining the shaft within the aperture.

17. The assembly of claim 16, wherein the relief feature on the first leg comprises a plurality of relief features formed on the first retainer leg and the relief feature on the second retainer leg comprises a plurality of relief features formed on the second retainer leg, and wherein the plurality of relief features on the first retainer leg define a first relieved surface area and the plurality of relief features on the second retainer leg define a second relieved surface area and a greater proportion of the first relieved surface area and a greater proportion of the second relieved surface area are disposed closer to the proximal end than the distal ends.

18. The retaining ring of claim 16, wherein the retaining ring defines a midplane extending between the proximal end and the distal ends and including the longitudinal axis, and a central plane that is orthogonal to the midplane and includes the longitudinal axis, and wherein the plurality of relief features on the first retainer leg and the plurality of relief features on the second retainer leg are disposed asymmetrically with reference to the central plane.

19. The assembly of claim 18, wherein the plurality of relief features on the first retainer leg comprises a mirror image of the plurality of relief feature on the second retainer leg about the midplane.

20. The assembly of claim 18, wherein the plurality of relief features on the first retainer leg and the plurality of relief features on the second retainer leg comprise substantially rectangular recesses.

* * * * *